United States Patent
Brewer

[15] 3,703,245
[45] Nov. 21, 1972

[54] FILLER CAP
[72] Inventor: Robert W. Brewer, Dayton, Ohio
[73] Assignee: General Motors Corporation, Detroit, Mich.
[22] Filed: Aug. 19, 1971
[21] Appl. No.: 173,086

[52] U.S. Cl. ...........................220/40 R, 220/24 C
[51] Int. Cl. ............................................B65d 41/06
[58] Field of Search .................220/40 R, 40 S, 24 C

[56] References Cited

UNITED STATES PATENTS 1,845,409 2/1932 Golden ....................220/40 R
1,866,818 7/1032 Reid........................220/40 R Primary Examiner—Raphael N. Schwartz
Attorney—J. L. Carpenter et al.

[57] ABSTRACT

A filler cap for a motor vehicle fuel tank includes pairs of axially spaced locking and retaining tabs which successively engage the filler neck cam. When the first pair of tabs are disengaged, the second pair engage the cam to prevent direct removal of the cap and permit gradual pressure release from the tank. When the second pair of tabs are disengaged, the cap is completely removable from the filler neck.

2 Claims, 4 Drawing Figures

PATENTED NOV 21 1972 3,703,245
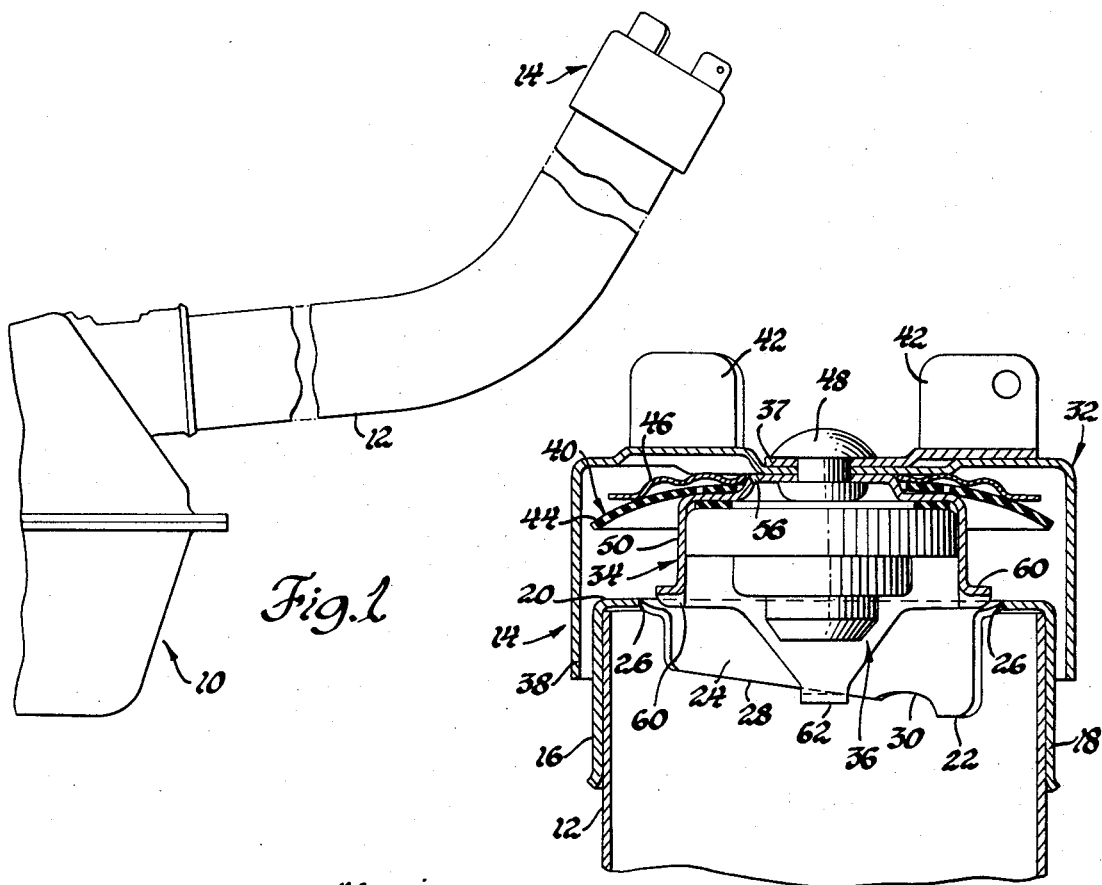
Fig.1
Fig.3
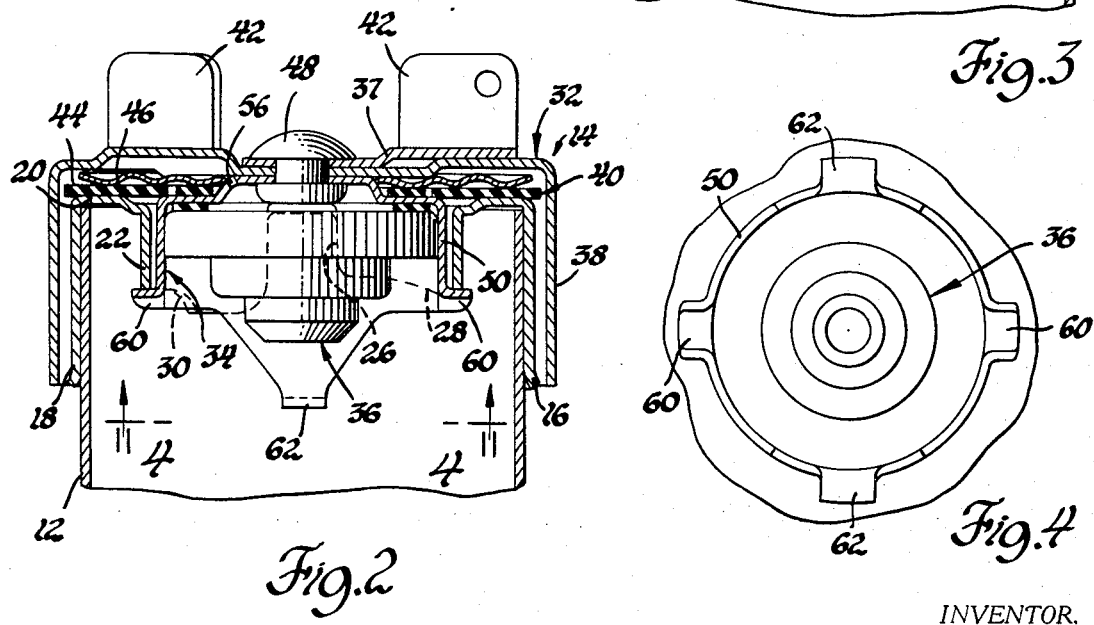
Fig.2
Fig.4
INVENTOR.
Robert W. Brewer
BY
Peter D. Sachtjen
ATTORNEY

FILLER CAP

The present invention relates to closure caps and, in particular, to filler caps for sealing the filler neck of a motor vehicle fuel tank.

Currently, the filler caps for motor vehicle fuel tanks are provided with means which limit the escape of fuel from the tank. For instance, a valve assembly in the cap controls pressure conditions within the tank to reduce the tendency of the fuel to surge out the filler neck when the cap is removed.

The present invention minimizes any remaining surging tendency by providing a cap which must be removed in such a manner that cap removal time is increased sufficiently to allow complete pressure relief of the tank. This feature is provided by axially spaced pairs of locking and retaining tabs on the filler cap which are sequentially disengaged from the filler neck cam by alternate rotary and axial movement. Upon initial opening movement of the cap, the first pair of tabs are disengaged from the cam and the cap is axially movable to a venting position wherein the second pair of tabs engage the cam and the filler cap cooperates with the fuel neck to provide restricted venting of the tank. Additionally, the retention of the cap on the neck in cooperation with an elongated cylindrical flange which surrounds the filler neck opening serves to deflect any surging vapor or liquid fuel. After pressure release from the tank, the cap is rotated until the second pair of tabs are disengaged from the cam and, by additional axial movement, the cap is completely removable from the filler neck. By the use of successive axial and rotational movements, the cap removal time is extended and exceeds the venting time thereby substantially eliminating surging of the fuel out of the filler neck.

The above and other features of the present invention will be apparent to one skilled in the art upon reading the following detailed description, reference being made to the accompanying drawings illustrating a preferred embodiment of the present invention in which:

FIG. 1 is a side elevational view of a motor vehicle fuel tank having a filler neck sealed by a filler cap made in accordance with the present invention;

FIG. 2 is an enlarged cross-sectional view of the filler cap in the locked position on the filler neck;

FIG. 3 is a view similar to FIG. 2 showing the filler cap in an intermediate venting position; and FIG. 4 is a view taken along line 4—4 of FIG. 2 showing the orientation of the locking tabs.

Referring to FIG. 1, there is shown a motor vehicle fuel tank 10 including an upwardly projecting filler neck 12 having an opening which is sealed by a filler cap 14. When the cap 14 is removed, the tank 10 is filled in a conventional manner through the filler neck 12. When the filler cap 14 is in a locked position, the fuel supply contained within the tank 10 subject to pressure relief in a manner described below.

Referring to FIG. 2, the filler neck 12 comprises a pipe which terminates its upper end with an annular filler base 16. The filler base 16 includes a cylindrical sleeve 18 which engages the side of the filler neck 12, an annular upper seating surface 20, and a downwardly projecting cylindrical mouth 22, the inner surface of which defines the fuel opening. As shown in FIG. 3, the mouth 22 is provided with a pair of diametrically opposed downwardly projecting cams 24 which are circumferentially spaced by axially extending cap withdrawal slots 26. The cams 24 are provided with camming surfaces 28 extending between lower detent notches 30 and the withdrawal slots 26. The surface of the slot 26 adjacent the detent 30 defines a stop which limits opening movement of the cap 14. The notch 30 defines a stop which limits closing movement of the cap 14.

The filler cap 14 comprises a cover member 32, an internal cup member 34, and a valving assembly 36. The valving assembly 36 is conventional in construction and permits venting of the fuel tank 10 when pressure conditions therewithin exceed a predetermined level. Additionally, the valving assembly 36 admits air into the tank when vacuum conditions exceed a predetermined amount.

The cover member 32 includes a circular lid 37 terminating at its outer diameter with an elongated downward projecting flange 38 which projects axially beyond the lower extremity of the cup member 34. The flange 38 surrounds the fuel opening during removal of the filler cap 14 to deflect any vapor and liquid fuel downwardly along the filler neck 12.

As shown in FIG. 3, the cap 14 additionally includes a sealing assembly 40 and a handle 42. The sealing assembly 40 comprises an annular diaphragm 44 and an annular leaf spring 46 which normally biases the diaphragm 44 to a concave shape. The diaphragm 44 and the spring 46 are retained between lid 37 and the cup member 34 and, together with the locking handle 42, are centrally fixedly attached to the cover 32 by a rivet 48. In the locked position, the sealing assembly 40 engages the seating surface 20 on the filler neck 12 thereby sealing the opening. As the filler cap 14 is removed, the diaphragm 44 is released from the seating surface 20 to permit restricted pressure release from the tank 10.

The cup member 34 includes a cylindrical dome 50 in which the valving assembly 36 is frictionally retained. Suitable vents 56 are provided in the cup member 34 for fluidly connecting the valving assembly 36 to atmosphere. The dome 50 is provided at its lower end with pairs of axially spaced locking tabs 60 and retaining tabs 62. As shown in FIG. 4, the tabs of each pair are diametrically opposed with the tabs 62 oriented perpendicular to the tabs 60. Both pairs of tabs are circumferentially spaced equal to the withdrawal slots 26. However, the tabs may be relatively positioned at any desired angular spacing.

The tabs 60, 62 project radially outwardly from the dome 50 and each are adapted to engage the camming surfaces 28 on the filler neck cams 24. The locking tabs 60 are axially spaced from the cover 32 and the sealing assembly 40 such that when the tabs 60 are in the illustrated locked position in the detents 30, the sealing assembly 40 is firmly seated against the seating surface 20. The retaining tabs 62 are axially spaced from the locking tabs 60 so as to engage the camming surfaces 28 midway between the detents 30 and the slots 26.

Upon initial opening movement of the filler cap 14, the locking tabs 60 ride along the camming surfaces 28 until they register with the slots 26. During this rotation, the sealing assembly 40 is axially released from the seating surface 20 thereby venting the tank 12. The cap 14 is then axially withdrawn through the slots 26 until restrained by the retaining tabs 62 engaging the camming surfaces 28 at a first released position. This engagement prevents additional axial movement of the filler cap and provides sufficient additional time for complete release of fuel tank pressure.

Thereafter, the cap 14 is additionally rotated until the second set of retaining tabs 62 register with withdrawal slots 26 at a second released position and the cap 14 is freely removable from the filler neck 12 by additional axial movement.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A filler cap for a fuel tank filler neck having an opening defined by projecting camming surfaces which are circumferentially spaced by axially extending cap withdrawal slots, said filler cap comprising: a cover member including a lid portion; a cup member carried by the lid portion and axially receivable in said opening; outwardly projecting locking tabs formed on said cup member and axially spaced from said lid portion, said locking tabs being spaced equal to said withdrawal slots and engaging said camming surfaces upon closing movement of said cover member to seat said cover member against said filler neck, said locking tabs being disengaged from said camming surfaces at a first released position wherein said locking tabs are aligned with and axially withdrawable through said slots; outwardly projecting retaining tabs formed on said cup member and axially spaced thereon remote from said locking tabs and said lid portion, said retaining tabs being circumferentially spaced equal to said withdrawal slots and being axially spaced relative to said locking tabs so as to engage said camming surfaces when the cover member is in said first released position thereby preventing direct removal of said cap, said retaining tabs being disengaged from said camming surfaces by additional opening movement of said cover member to a second released position wherein said retaining tabs are aligned with the slots and said cap is fully removable from said filler neck.

2. A fuller cap for a fuel tank filler neck having an annular seating surface inwardly bounded by a pair of downwardly projecting arcuate cams defining an axial opening wherein said cams are circumferentially spaced by a pair of axially extending cap withdrawal slots, said filler cap comprising: an annular cover member including a circular lid and a downwardly depending cylindrical flange; sealing means carried by said lid and engageable with the seating surface to seal the opening; a cup member connected to said lid and axially receivable in said opening; a pair of radially outwardly projecting locking tabs formed on said cup member, said locking tabs being axially spaced from said lid and circumferentially spaced equal to said withdrawal slots, said locking tabs being insertable through said slots and engageable with said cams upon closing movement of said cover member for causing axial advancement of said sealing means toward said seating surface to a closed position whereat said sealing means engages said seating surface, said locking tabs being disengaged from said cams upon opening movement of said cover member to a first released position wherein said locking tabs register with said slots and are axially withdrawable therethrough, said flange on said cover member exteriorly encircling said neck and extending axially beyond said locking tabs thereby shielding the opening at said first released position and deflecting surging vapor and liquid fuel away from said opening and downwardly along the neck; a pair of radially outwardly projecting retaining tabs formed on said cup member and axially spaced remote from said locking tabs and said sealing means, said retaining tabs being circumferentially spaced equal to said withdrawal slots and being spaced relative to said first mentioned tabs so as to axially register with said cams when the locking tabs are withdrawn beyond said slots thereby preventing direct removal of said cap and increasing filler cap removal times so as to minimize surging of fuel from the tank, said cap being fully removable by additional opening movement of the retaining tabs to a second released position wherein said retaining tabs are aligned with the slots and the cap is removable by additional axial movement.

* * * * *